(12) United States Patent
Shveidel et al.

(10) Patent No.: US 12,147,676 B1
(45) Date of Patent: Nov. 19, 2024

(54) DATA STORAGE SYSTEM WITH DYNAMIC ADJUSTMENT OF POLLING INTERVALS

(71) Applicant: Dell Products L.P., Round Rock, TX (US)

(72) Inventors: Vladimir Shveidel, Pardes-Hana (IL); Lior Kamran, Richon LeZion (IL); Amitai Alkalay, Kadima (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/225,836

(22) Filed: Jul. 25, 2023

(51) Int. Cl.
  *G06F 3/06* (2006.01)
(52) U.S. Cl.
  CPC .......... *G06F 3/0611* (2013.01); *G06F 3/0655* (2013.01); *G06F 3/0673* (2013.01)
(58) Field of Classification Search
  CPC ..... G06F 3/0611; G06F 3/0655; G06F 3/0673
  See application file for complete search history.

(56) References Cited

U.S. PATENT DOCUMENTS

| 8,903,954 B2 | 12/2014 | Luna et al. | |
| 9,514,162 B2 | 12/2016 | Bertram et al. | |
| 10,871,991 B2 | 12/2020 | Alkalay et al. | |
| 10,884,799 B2 | 1/2021 | Alkalay et al. | |
| 2014/0281235 A1* | 9/2014 | Liu | G06F 11/3409 711/118 |
| 2019/0026220 A1* | 1/2019 | Lee | G06F 3/0611 |
| 2019/0155542 A1* | 5/2019 | Kim | G06F 13/1652 |
| 2020/0348845 A1* | 11/2020 | Chen | G06F 3/0613 |
| 2020/0401339 A1* | 12/2020 | Sun | G06F 3/0659 |
| 2021/0029219 A1 | 1/2021 | Kamran et al. | |

\* cited by examiner

*Primary Examiner* — Ryan Bertram
(74) *Attorney, Agent, or Firm* — BainwoodHuang

(57) ABSTRACT

A polling interval of a poller in a data storage system is dynamically adjusted to balance latency and resource utilization. Performance metrics are regularly estimated or measured and derived values are calculated including a latency share and a cost per event, based on a latency metric for polling latency and a cost metric for use of processing resources. A target latency share is adjusted by (1) an increase based on a CPU utilization metric being above a utilization threshold, and (2) a reduction based on the CPU utilization metric being below the utilization threshold and the cost per event being lower than a cost-per-event threshold. The polling interval is adjusted by (1) increasing the polling interval based on the latency share being less than the target latency share, and (2) decreasing the polling interval based on the latency share being greater than the target latency share.

20 Claims, 2 Drawing Sheets

DATA STORAGE SYSTEM WITH DYNAMIC ADJUSTMENT OF POLLING INTERVALS

BACKGROUND

The present invention is related to the field of data storage systems, and in particular to data storage systems employing polling for detecting and processing events during data storage operations such as reads and writes.

SUMMARY

A method is disclosed of dynamically adjusting a polling interval of a poller to balance latency and resource utilization of the poller for detecting I/O operation events in a data storage system.

The method includes regularly estimating or measuring performance metrics for the poller and calculating derived values including a latency share and a cost per event, wherein the performance metrics including at least a latency metric and a cost metric, the latency metric reflecting latency related to the polling interval, and the cost metric reflecting use of processing resources by the poller. The latency share is the latency metric divided by an overall synchronous I/O operation latency value, and the cost per event is the cost metric divided by an events count.

A target latency share is adjusted by (1) increasing the target latency share based on a CPU utilization metric being above a utilization threshold, and (2) reducing the target latency share based on the CPU utilization metric being below the utilization threshold and the cost per event being lower than a cost-per-event threshold.

The polling interval is then adjusted by (1) increasing the polling interval based on the latency share being less than the target latency share, and (2) decreasing the polling interval based on the latency share being greater than the target latency share.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
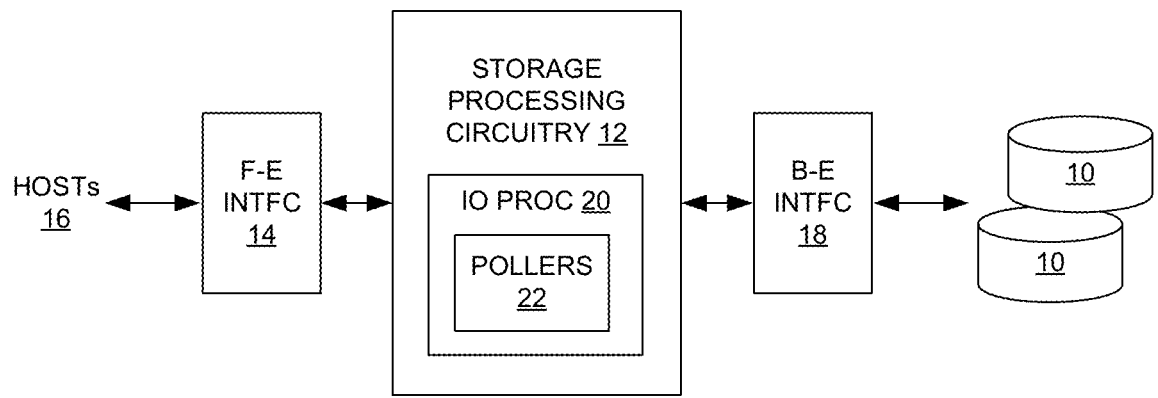
FIG. 1 is a block diagram of a data storage system having pollers operating according to a disclosed process for dynamic adjustment of polling interval.

Storage system IO processing time may be divided into two parts:

1) CPU processing time: this part includes actual CPU processing time i.e., all the periods of time in which the CPU cycles are spent to process the IO.

2) Waiting time: this part includes waiting on pollers-IO processing involves initiating operations and waiting for their completion. The storage system uses pollers that poll the interfaces for new events the IO is waiting for.

The "polling" design, as opposed to "interrupt" design, is optimized for a storage system that requires low latency and high IOPS (I/O per second)—as there are no context switches that occur when interrupts are involved. The current disclosure assumes use of a polling design.

To achieve low latency, the storage system preferably allows the pollers to run at a high frequency (optimally all the time) to detect events as soon as they occur.

However, running the pollers takes CPU cycles, that could be used for IO processing. Therefore, running the pollers at a high frequency may result in a waste of CPU cycles when there are no new events to pull. Moreover, if the system is completely idle, running the pollers all the time (with unreasonable frequency) may essentially (and unjustifiably) increase the power consumption.

On the other hand, running the pollers in low frequency will impact (i.e., increase) the IO latency, because the IO may wait a longer time to receive an event, before it may resume processing.

Therefore, there's a tradeoff in running the pollers-between the IO latency and waste of CPU cycles and power consumption. The higher the frequency the lower the IO latency, but in the cost of CPU cycles; the lower the frequency, less CPU cycles are wasted, but in the cost of increased IO latency.

The relative impact of polling rate may be more critical in scenarios where the system is underloaded. When the system is more highly loaded, the IO latency includes long waiting for different types of resources (Locks, Backend, etc.), so the latency is generally high, and the portion spent waiting for Poll event is not that significant.

Existing naïve approaches are either always polling (where significant CPU cycles may be wasted), or polling based on only the CPU utilization or some other simplistic model (e.g., reduce poller frequency when there are no IOs and increase when IOs arrive), which may significantly impact IO latency.

It should be noted that the current system load state may not be a good metric to use for reaching optimal poller frequency. Usually, storage systems may optimize performance by postponing certain operations (such as dedupe, compression, garbage collection etc.) to a later time when the system is idle—this allows the system to reach very high IOPS during peak hours, however, the system accumulates "debt" that must be handled/paid within a certain interval time. Thus, even if the IO rate is low, the system may need CPU to handle high system debt.

Furthermore, there could be no fixed poller frequency that would be optimal for all cases, since IO load changes over time, background load changes, etc.

To address the above problems, a technique is used to dynamically adjust each of the pollers frequency individually, to optimally balance between Io latency and wasted CPU cycles, which can help improve overall system performance and efficiency.

Embodiments

FIG. 1 shows a data storage system which includes data storage devices 10, storage processing circuitry 12, front-end interface circuitry (F-E INTFC) 14 for interfacing to data storage clients referred to as "hosts" 16, and back-end interface circuitry (B-E INTFC) 18 providing an interface for the storage processing circuitry 12 to the storage devices 10. As generally known, the storage processing circuitry 12 includes a set of processors (also termed CPUs) and memory and executes data storage computer program instructions to realize a variety of data storage services using the storage devices 10. The present disclosure focuses on certain operations of regular input/output (IO) processing 20, namely its use of pollers 22 for detecting and responding to events during the processing of IO requests (storage reads and writes). While various specific examples are used below for illustration, those skilled in the art will appreciate the applicability of the disclosed techniques to other use cases involving the use of polling for event detection during operation of computerized systems.

Components of Waiting Time

At a high level, data storage system IO processing may be divided into two general activities:

1) CPU processing time: this part includes actual CPU processing time i.e., all the periods of time in which the CPU cycles are spent to process the IO. This may include, for example, hash digest calculation, compression, parity calculation, data-path processing (e.g., address mapping), etc.

2) Waiting time: this part includes all the periods of time where the IO is waiting for something to occur, during which the CPU processing is typically suspended. This part may be further divided into two sub-parts:

A) Waiting in Scheduler: waiting for storage system software scheduler to grant the CPU for processing the IO.

B) Waiting on pollers: IO processing involves initiating operations and waiting for their completion. The storage system uses pollers 22, which are polling the interfaces (e.g., 14, 16) for new events the IO is waiting for. The following are examples of the pollers 22 used in the storage system:

i) Front-End: Polling the F-E interface 14 for receiving IO requests from the user. The IO processing will start only after the Front-End poller pulls the IO request.

ii) RPC Messaging: An interface for sending/receiving messages to/from other data storage systems (e.g., in a cluster or remote-mirroring environment). The RPC Messaging polls for new messages from other Nodes in the system. The IO processing may involve sending messages to another Node and waiting for a reply.

iii) Back-End: Polling the B-E interface 18 for accessing a device 10, e.g., for Read/Write IOs from/to the devices 10. A back end poller polls for completion of read/write requests to a device 10. Processing for Read IO request may involve reading metadata from a device 10.

iv) HW Accelerator: An interface for HW accelerators that may be used for ancillary operations, such as offloading compression computation to separate hardware engines.

v) Others, depending on specific hardware architecture.

Figure 2:
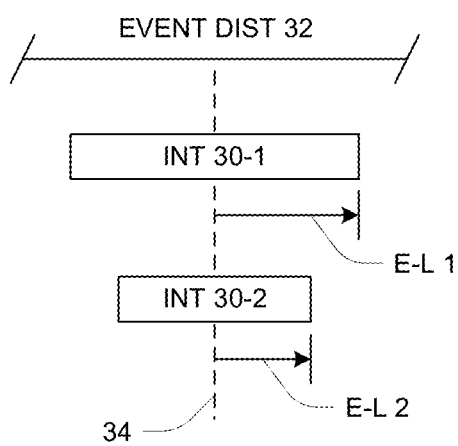
FIG. 2 is a schematic depiction of estimated extra latency of a poller.

FIG. 2 illustrates an important aspect of poller-related delay. Each poller 22 is configured to poll at a certain rate, the inverse of which is the polling interval. A polling rate of 1,000 per second corresponds to a 1 mS polling interval, for example. FIG. 2 shows two example polling intervals, a first interval 30-1 and a second shorter interval 30-2. For description purposes it is assumed that an event being polled has a uniform distribution (EVENT DIST) 32 over some period at least as long as the longest practical polling interval, such that the event is also uniformly distributed across any candidate polling interval 30. In that case, the event being polled will on average occur in the middle of the polling interval (at point 34 as shown), and thus the average delay between event occurrence and detection by the poller is ½ of the polling interval. Thus FIG. 2 illustrates a first "extra latency" E-L 1 when polling interval 30-1 is used, and a shorter extra latency E-L 2 when polling interval 30-2 is used. For lower latency during operation, the shorter polling interval 30-2 is obviously preferred, but this advantage comes with a cost—the polling operation itself consumes resources especially CPU, and thus higher-frequency polling (shorter interval) consumes a greater share of resources, which may deleteriously affect other aspects of I/O processing performance. The term "extra latency" in this context alludes to the fact that the polling-related latency is only part of the overall latency for processing an IO from start to completion, as noted above.

Thus, the pollers 22 are operated in a manner providing for dynamic adjustment of their polling frequency/intervals to provide a desired balance between IO latency and polling-related "cost" (CPU utilization), which can improve overall system performance and efficiency. The dynamic adjustment may be performed by specialized functionality of the pollers 22 themselves or another component of the storage processing 12.

Figure 3:
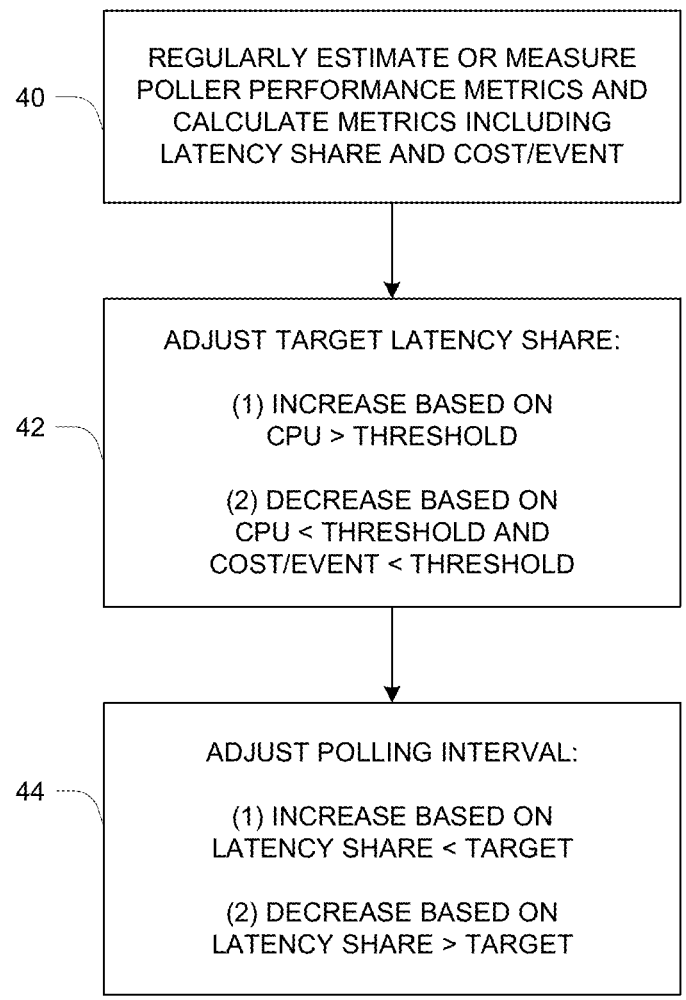
FIG. 3 is a flow diagram of the process for dynamic adjustment of polling interval.

FIG. 3 outlines the basic process of poller interval adjustment.

At 40, the process regularly estimates and/or measures performance metrics for the poller and calculating derived values including a latency share and a cost per event. The performance metrics include at least a latency metric and a cost metric, where the latency metric reflects latency related to the polling interval, and the cost metric reflects use of processing resources by the poller. The latency share is the latency metric divided by an overall I/O operation latency value, and the cost per event is the cost metric divided by an events count.

The various values used in step 40 and the remaining steps of FIG. 3 have specific counterparts in a specific example described in detail further below.

At 42, the process adjusts a target latency share by (1) increasing the target latency share based on a CPU utilization metric being above a utilization threshold, and (2) reducing the target latency share based on the CPU utilization metric being below the utilization threshold and the cost per event being lower than a cost-per-event threshold.

At 44, the polling interval is conditionally adjusted by (1) increasing the polling interval based on the latency share being less than the target latency share, and (2) decreasing the polling interval based on the latency share being greater than the target latency share. As described below, it may be helpful to include some hysteresis by using high and low limits of a small range about the target latency share (i.e., increase interval only if current latency share is sufficiently below the target latency share, and decrease interval only if current latency share is sufficiently above the target latency share). Generally, if neither condition (1) nor (2) is met, then the polling interval can be left as it is, i.e., no adjustment.

Illustrative Example

A more specific example and detailed description of the general process of FIG. 3 is now provided.

Polling frequency for each poller 22 is dynamically adjusted based on the following metrics that are measured/updated in an ongoing regular manner:

1) Poller Extra Latency: The latency that originates from the poller period. This could be measured by the average time interval between event creation and the time the event was pulled by the poller. Alternatively, this could be estimated as half the Poll interval (i.e., the time between consecutive polls), such as described above with reference to FIG. 2.

2) Poller CPU Cost: A measure of poller runtime i.e., the time duration or the number of CPU cycles required for polling. This duration may be different for different pollers i.e., one may take as little as 5 us while other may take 50 us.

3) Poller Feedback/Average Events Count: the average number of events the poller pulled in the last time window. This value may be less than 1 (e.g., 1 event in two Poll cycles gives an average of 0.5). This metric is used to calculate the poller CPU Cost per event, which serves as an indication for the average IO latency introduced by the poller.

4) CPU Utilization: the CPU utilization percent i.e., the percent of time the CPU was running and not idle.

5) Normalized Depth: an indication of the overall background processing required in the system. (i.e., this includes the postponed "debt" of processing requires).

6) Average IO Latency: measures the average synchronous portion of IO latency i.e., the time duration between IO arrival and the time the IO is acknowledged to the host.

The dynamic adjustment is intended to find a good balance between IO latency impact and CPU time spent delivering each poller event for specific time point/conditions (i.e., CPU utilization, IO latency, etc.) For each poller 22, this is done using the following variables:

Target_Extra_Latency: the poller extra latency targeted for the next time window, which defines the poller frequency. This is the "raw" output of the algorithm.

Target_Extra_Latency_Share: The percentage of Target_Extra_Latency in the Average IO Latency i.e., (Target Extra Latency/Average IO Latency*100%)

Based on the Target_Extra_Latency_Share and current poller Extra Latency Share, the Poll Interval (the time between consecutive polls) is adjusted (increased or decreased) to move the poller latency in the direction of Target_Extra_Latency_Share. The checking and adjusting is performed for each of the pollers 22 individually. Note that this process may be applied to only those pollers 22 that are involved in the IO synchronous path and thus impact the IO latency (other pollers may have less overall performance impact and thus may be operated more statically).

I. Dynamically update Target Extra Latency Share

1) The following metrics (described above) are regularly monitored:

Poller Extra Latency
Poller CPU Cost
Poller Feedback (Average Events Count)
CPU Utilization
Normalized Depth
Average IO latency 2) Additionally, the following derivations of the metrics above are calculated:

Poller_Cost_Per_Event: (Poller CPU Cost/Average Events Count) i.e., the processing/CPU cost of delivering one poller event. This value tends to be a much more representative metric than poller CPU Cost. This value is a specific example of the cost/event metric of FIG. 3.

Extra_Latency_Share: (Poller Extra Latency/Average_IO_Latency*100%) i.e., the share of extra latency added by the poller within the End-to-end IO latency. Usually, this share value is a more reasonable target than the raw extra latency. For example, even if the extra latency is relatively high, e.g., 100 us, but it is less than 5% of the overall latency, then there is no sense to reduce it and pay extra CPU cost for it. This value is a specific example of the latency share metric of FIG. 3.

3) Initialization:

a. Set the Poll_Interval for each of the pollers to a predefined default value (e.g., 100 us).

b. Set the Target_Extra_Latency_Share for each of the pollers to a predefined default value (e.g., 10%).

The remaining steps below are performed for each poller individually.

4) If the Poller_Cost_Per_Event is below a predefined threshold (e.g., 1 us), THEN set the Target_Extra_Latency_Share for this poller to some minimum value (e.g., Minimal Extra_Latency_Share a percentage that provides a negligible extra IO latency).

Note: In this case, there is a minimal CPU cycles cost for running this poller, so an adjustment is made to reduce waiting time and improve IO latency. Running the poller in this case is very cheap, such that it doesn't makes a sense to regulate/optimize the poller rate.

5) For other cases: at regular intervals (e.g., every 1-5 seconds), check if the Target_Extra_Latency_Share needs to be either increased or decreased (default is no adjustment):

a. If:
 i. the Target_Extra_Latency_Share is greater than the Minimal_Extra_Latency_Share; AND
 ii. the CPU_Utilization is below a predefined threshold (e.g., 90%) AND
 iii. the Poller_Cost_Per_Event is lower than a predefined threshold (i.e., preventing excessive running when the system is underutilized (previous condition). Generally, this threshold should be high; AND
 iv. the Normalized_Depth is below a predefined threshold,
THEN, reduce the Target_Extra_Latency_Share by one step (e.g., 0.5%)

b. If:
 i. the CPU_Utilization is equal or above the predefined threshold, AND
 ii. the Target_Extra_Latency_Share is below a predefined upper threshold (e.g., 10%),
THEN increase the Target_Extra_Latency_Share by one step.

The thresholds above may be configurable and/or dynamically tunable. The use of Normalized Depth in the above test can help with accuracy in a system in which the CPU Utilization is also used separately to manage the level of background activity.

II. Dynamically Adjust the Poll Interval to Reach the Target_Extra_Latency Share Every time window, check if the Polling Interval needs to be adjusted. To avoid jitter and provide hysteresis, a range about the Target_Extra_Latency_Share is used that is defined by two thresholds, High_Target_Extra_Latency_Share and Low_Target_Extra_Latency_Share, where High_Target_Extra_Latency_Share is always higher than Low_Target_Extra_Latency_Share.

a. If Extra_Latency_Share>High_Target_Extra_Latency_Share THEN decrease the Poll_Interval by a predefined step (i.e., 10%).

b. Alternatively, if Extra_Latency_Share<Low_Target_Extra_Latency_Share, THEN increase the Poll_Interval by a predefined step (i.e., 10%).

c. Otherwise, no change.

The above operation effects a dynamic adjustment of polling interval based on balancing polling latency with polling cost. It will be appreciated that various specific values may be changed or tuned in a given embodiment or instance (e.g., thresholds, step sizes, etc.).

The basic technique as described above may be augmented to address potential special cases.

For example, in some conditions it may be that increasing polling frequency does not actually reduce latency share, so the increase represents wasted additional processing. In this case, a recent history of relevant values can be maintained (i.e., the Poll Interval as well as the Poller_Cost_Per_Event and Extra_Latency_Share, for the last several (e.g., 3-5) adjustment cycles). If it is detected that increasing the Poll frequency causes growth of Poller_Cost_Per_Event without reducing Extra_Latency_Share, it means that increasing the poller frequency is resulting in wasted extra polling. In this case, the poll frequency can be reduced to the value it was a few cycles ago and then prevented from being increased over some number (e.g., 10-50) of succeeding cycles, even if the basic processing as described above recommends an increase.

Additionally, some pollers 22 may handle multiple events during processing an IO request, which increases their poller Interval impact on the average IO latency. This could be taken into account by calculating the average number of poller events per IO request and using it as a coefficient to the Extra Latency Share of each poller.

While various embodiments of the invention have been particularly shown and described, it will be understood by those skilled in the art that various changes in form and details may be made therein without departing from the scope of the invention as defined by the appended claims.

What is claimed is:

1. A method of dynamically adjusting a polling interval of a poller to balance latency and resource utilization of the poller for detecting I/O operation events in a data storage system, comprising:
   regularly estimating or measuring performance metrics for the poller and calculating derived values including a latency share and a cost per event, the performance metrics including at least a latency metric and a cost metric, the latency metric reflecting latency related to the polling interval, the cost metric reflecting use of processing resources by the poller, the latency share being the latency metric divided by an overall synchronous I/O operation latency value, the cost per event being the cost metric divided by an events count;
   adjusting a target latency share by (1) increasing the target latency share based on a CPU utilization metric being above a utilization threshold, and (2) reducing the target latency share based on the CPU utilization metric being below the utilization threshold and the cost per event being lower than a cost-per-event threshold; and
   adjusting the polling interval by (1) increasing the polling interval based on the latency share being less than the target latency share, and (2) decreasing the polling interval based on the latency share being greater than the target latency share.

2. The method of claim 1, wherein the poller is one of a front-end poller or a back-end poller, the front-end poller being configured and operative to poll a front-end interface for receipt of new IO requests from a host computer, the back-end poller being configured and operative to poll a back-end interface for completion of storage read and write requests to a storage device of the data storage system.

3. The method of claim 1, wherein the poller is one of a messaging poller and an accelerator poller, the message poller being configured and operative to poll a communications interface for sending/receiving messages to/from another other data storage system, the accelerator poller being configured and operative to poll an interface to a hardware accelerator used to offload processing tasks from the data storage system.

4. The method of claim 1, wherein the latency metric is estimated as one-half of a current value of the polling interval.

5. The method of claim 1, wherein the adjusting step includes use of hysteresis including high and low limits of a small range about the target latency share, by (1) increasing the polling interval based on the latency share being less than the low limit, and (2) decreasing the polling interval based on the latency share being greater than the high limit.

6. The method of claim 5, wherein, based on the latency share being within the small range about the target latency share, the polling interval is left unchanged.

7. The method of claim 1, wherein adjusting the target latency share further includes, based on the cost per event being below a predetermined cost/event threshold, setting the target latency share to a predetermined minimum value.

8. The method of claim 1, further including a preceding initialization step in which (1) the polling interval is set to a predetermined initial polling interval value, and (2) the target latency share is set to a predetermined latency share value.

9. The method of claim 1, further including:
   maintaining a recent history of values of the polling interval, latency share and cost per event; and
   determining, based on the recent history of values, whether decreasing the polling interval has increased the cost per event without reducing the latency share, and if so then (a) increasing the polling interval to a recent increased value and (b) preventing the polling interval from being increased for some number of subsequent cycles notwithstanding that the value of the target latency share would otherwise result in increasing the polling interval.

10. The method of claim 1, further including, for a poller that handles multiple events during processing of an IO request, (1) calculating an average number of poller events per IO request, and (2) using the calculated average number as a coefficient applied to the latency share for that poller.

11. A data storage system having storage devices and storage processing circuitry configured and operative to execute computer program instructions to dynamically adjust a polling interval of a poller to balance latency and resource utilization of the poller for detecting I/O operation events in the data storage system, by:
   regularly estimating or measuring performance metrics for the poller and calculating derived values including a latency share and a cost per event, the performance metrics including at least a latency metric and a cost metric, the latency metric reflecting latency related to the polling interval, the cost metric reflecting use of processing resources by the poller, the latency share being the latency metric divided by an overall synchronous I/O operation latency value, the cost per event being the cost metric divided by an events count;
   adjusting a target latency share by (1) increasing the target latency share based on a CPU utilization metric being above a utilization threshold, and (2) reducing the target latency share based on the CPU utilization metric being below the utilization threshold and the cost per event being lower than a cost-per-event threshold; and
   adjusting the polling interval by (1) increasing the polling interval based on the latency share being less than the target latency share, and (2) decreasing the polling interval based on the latency share being greater than the target latency share.

12. The data storage system of claim 11, wherein the poller is one of a front-end poller or a back-end poller, the front-end poller being configured and operative to poll a front-end interface for receipt of new IO requests from a host computer, the back-end poller being configured and operative to poll a back-end interface for completion of storage read and write requests to a storage device of the data storage system.

13. The data storage system of claim 11, wherein the poller is one of a messaging poller and an accelerator poller, the message poller being configured and operative to poll a communications interface for sending/receiving messages to/from another other data storage system, the accelerator poller being configured and operative to poll an interface to a hardware accelerator used to offload processing tasks from the data storage system.

14. The data storage system of claim 11, wherein the latency metric is estimated as one-half of a current value of the polling interval.

15. The data storage system of claim 11, wherein the adjusting includes use of hysteresis including high and low limits of a small range about the target latency share, by (1) increasing the polling interval based on the latency share being less than the low limit, and (2) decreasing the polling interval based on the latency share being greater than the high limit.

16. The data storage system of claim 15, wherein, based on the latency share being within the small range about the target latency share, the polling interval is left unchanged.

17. The data storage system of claim 11, wherein adjusting the target latency share further includes, based on the cost per event being below a predetermined cost/event threshold, setting the target latency share to a predetermined minimum value.

18. The data storage system of claim 11, wherein the storage processing is further configured and operative when executing the computer program instructions to perform a preceding initialization step in which (1) the polling interval is set to a predetermined initial polling interval value, and (2) the target latency share is set to a predetermined latency share value.

19. The data storage system of claim 11, wherein the storage processing is further configured and operative when executing the computer program instructions to:

maintain a recent history of values of the polling interval, latency share and cost per event; and determine, based on the recent history of values, whether decreasing the polling interval has increased the cost per event without reducing the latency share, and if so then (a) increase the polling interval to a recent increased value and (b) prevent the polling interval from being increased for some number of subsequent cycles notwithstanding that the value of the target latency share would otherwise result in increasing the polling interval.

20. The data storage system of claim 11, wherein the storage processing is further configured and operative when executing the computer program instructions, for a poller that handles multiple events during processing of an IO request, to (1) calculate an average number of poller events per IO request, and (2) use the calculated average number as a coefficient applied to the latency share for that poller.

* * * * *